United States Patent [19]

Curtis

[11] Patent Number: 5,056,915
[45] Date of Patent: Oct. 15, 1991

[54] FIBER OPTIC CALIBRATION STANDARD APPARATUS

[75] Inventor: David D. Curtis, Haverhill, Mass.

[73] Assignee: The United States of America as represented by the Secretary of the Air Force, Washington, D.C.

[21] Appl. No.: 529,028

[22] Filed: May 25, 1990

[51] Int. Cl.$^5$ ............................................. G01N 21/00
[52] U.S. Cl. ................................. 250/227.25; 356/73.1
[58] Field of Search ................... 250/227.25; 356/73.1

[56] References Cited

U.S. PATENT DOCUMENTS

| | | | |
|---|---|---|---|
| 3,770,350 | 11/1973 | Stone et al. | 356/75 |
| 4,197,007 | 4/1980 | Costa et al. | 356/73.1 |
| 4,243,320 | 1/1981 | Gordon | 356/73.1 |
| 4,304,489 | 12/1981 | Wakabayashi et al. | 356/73.1 |
| 4,361,402 | 11/1982 | Costa | 356/73.1 |
| 4,391,517 | 7/1983 | Zucker et al. | 356/73.1 |
| 4,551,020 | 11/1985 | Reid et al. | 356/73.1 |
| 4,816,669 | 3/1989 | Andersen | 250/227 |
| 4,921,347 | 5/1990 | Wong et al. | 356/73.1 |

Primary Examiner—David C. Nelms
Assistant Examiner—Teresa Davenport
Attorney, Agent, or Firm—William Stepanishen; Donald J. Singer

[57] ABSTRACT

A fiber optic calibration standard apparatus having a fiber optic cable pair which have difference in length of one quarter the wavelength of the applied modulated signal and are coupled to a mirrored reflecting surface to provide reflection reference signals that are utilized to generate error correction signals. A matched termination has one end of an optical fiber sealed in a vial of index matching fluid to absorb the optical power incident to the fiber.

20 Claims, 2 Drawing Sheets ns are directed to fiber #4. The signal emerging from fiber #4 is demodulated by a p-i-n photodiode, and the resulting photo-current returns to the network analyzer. One reflection occurs at the end of fiber #2, and the second reflection occurs at the end of fiber #3. This leads to a summation of the optical power of each reflected wave, which depends on the relative microwave phase between the two reflected signals and the coupling symmetry of the directional coupler. The reflection magnitude and phase, measured at fiber #4, is unique to each directional coupler that is manufactured. Each HP8702A unit contains electronic firmware which stores the calibration data of the particular directional coupler that is delivered with a given unit.

FIBER OPTIC CALIBRATION STANDARD APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a microwave calibration standard apparatus, and in particular to a microwave fiber optic reflection calibration standard apparatus.

The state of the art of testing and utilizing optical fibers is well represented and alleviated to some degree by the prior art apparatus and approaches which are contained in the following U.S. Patents:

U.S. Pat. No. 3,770,350 issued to Stone et al. on Nov. 6, 1973;

U.S. Pat. No. 4,197,007 issued to Costa et al. on Apr. 8, 1980;

U.S. Pat. No. 4,243,320 issued to Gordon on 6 Jan. 6, 1981;

U.S. Pat. No. 4,391,517 issued to Zucher et al. on July 5, 1983: and

U.S. Pat. No. 4,816,669 issued to Andersen on Mar. 28, 1989.

The Stone et al. patent discloses the use of a long length of liquid-core optical fiber which is employed as a Raman cell. The fiber core contains the material whose Raman spectrum is to be analyzed.

The Costa et al. patent is directed to a device for evaluating the light transmitting characteristics of optical fibers by intercepting and measuring the radiant energy which is back-scattered from the entrance end of an optical fiber irradiated by a pulsed laser beam.

The Gordon patent describes methods for testing optical fibers to determine fiber length and the position of a reflective discontinuity in a fiber without the sophisticated and costly equipment required by current optical time domain reflectometry techniques.

The Zucher et al. patent discusses a method of measuring splice loss in optical fibers by obtaining a reference level of the light that is transmitted out of one end of the input fiber before making the splice. After the splice is made, with light on the reference level in the input fiber being incident on the splice, the radiometer provides an indication of light lost as a result of the splice.

The Andersen patent describes a method for determining the location of a reflection point along the fiber. A process for time localization of reflected pulses is utilized wherein at least two reflected pulses being received, the first one of which originates from a predetermined reference point, the second one from a reflection point whose position is to be determined.

In FIG. 1 there is shown a prior art reflection calibration test configuration. The network analyzer comprises a Hewlett Packard HP8702A lightwave component analyzer. With this test configuration, the network analyzer operates in a forward transmission measurement mode and provides microwave modulation to the laser. The microwave modulated optical signal propagates through the fiber optic directional coupler and experiences a 4 percent reflection at each glass/air interface at the end of fibers #2 and #3. The reflected portion of each signal propagates back through the directional coupler where approximately half of the reflected signals are directed to fiber #4. The signal emerging from fiber #4 is demodulated by a p-i-n photodiode, and the resulting photo-current returns to the network analyzer. One reflection occurs at the end of fiber #2, and the second reflection occurs at the end of fiber #3. This leads to a summation of the optical power of each reflected wave, which depends on the relative microwave phase between the two reflected signals and the coupling symmetry of the directional coupler. The reflection magnitude and phase, measured at fiber #4, is unique to each directional coupler that is manufactured. Each HP8702A unit contains electronic firmware which stores the calibration data of the particular directional coupler that is delivered with a given unit.

The accuracy limitations of this practice arise from two key factors. First, two reflections occur using this technique. As the quality of the cleaved fiber endfaces degrades over time, the reflections become less than 4 percent which leads to errors in magnitude measurements. Further, since the path length of the optical fiber in the directional coupler is temperature-dependent, the actual path length and insertion loss of the directional coupler at the time of measurement can vary significantly from the calibrated data stored within the machine, which leads to errors in phase and magnitude measurements. Secondly, this technique does not enable determination of the "reflection error correction terms" (reference 3) which are used in electrical reflection calibrations of network analyzers to mathematically remove errors associated with imperfections in the test set hardware. The use of error terms results in a high degree of measurement accuracy with electrical scattering parameters, and the concepts of error correction can be directly applied to fiber optic scattering parameter measurements.

While the above-cited prior art patents are instructive, it is clear that a need remains to provide a microwave fiber optic reflection calibration standard which solves the shortcomings of the prior art. The present invention is intended to satisfy that need.

SUMMARY OF THE INVENTION

The present invention utilizes reflection calibration standards which are fabricated from step-index single mode optical fiber and other optical materials. The reflection calibration standards are modeled after the offset short circuits and matched load calibration standards utilized to calibrate automatic vector network analyzer machines for reflection measurements of electrical microwave devices. The fiber optic calibration standards are used with a network analyzer that is outfitted with an optical test set which is a fiber network that converts electrical microwave signals to microwave-modulated optical signals and visa-versa.

It is one object of the present invention, therefore, to provide an improved fiber optic calibration standard apparatus wherein reflection analyzer measurements have an accuracy of ±0.15 dB.

It is another object of the invention to provide an improved fiber optic calibration standard apparatus to calibrate a network analyzer for microwave reflection measurements of fiber optic devices.

It is yet another object of the invention to provide an improved fiber optic calibration standard apparatus wherein calibration data is utilized to calculate reflection error correction terms.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
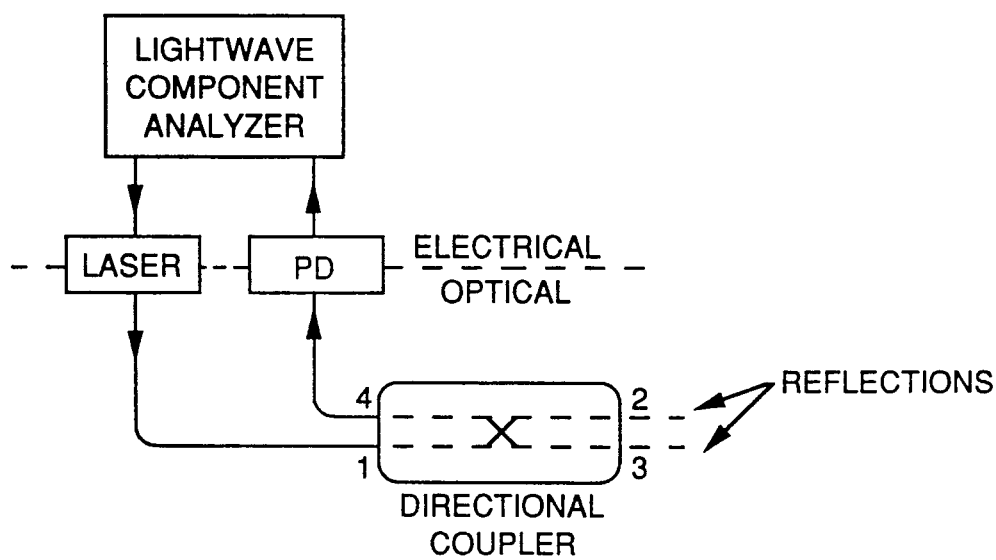
FIG. 1 is a block diagram of a prior art reflection calibration test configuration.
Figure 2:
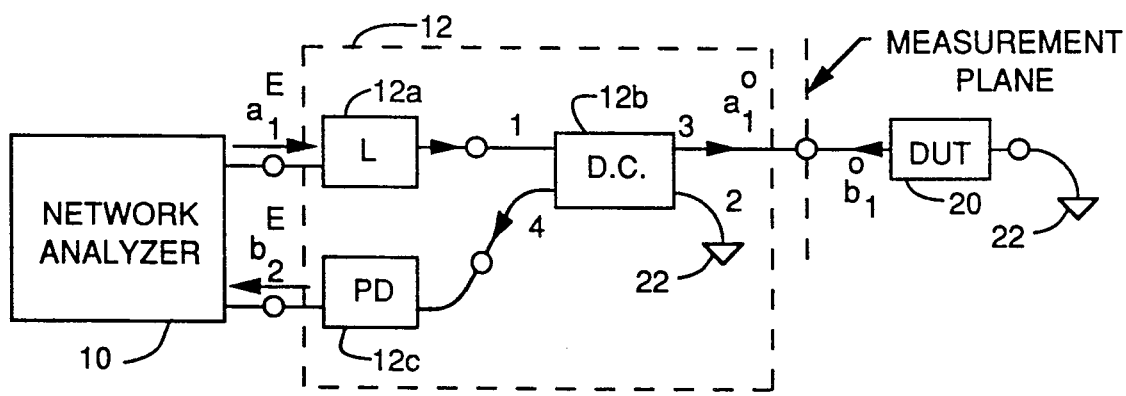
FIG. 2 is a block diagram of a network analyzer with an optical test set according to the present invention.

Referring now to FIG. 2, there is shown a block diagram of a network analyzer 10 utilizing an optical test set 12 to measure reflections in microwave-modulated optical signals which are applied to the device-under-test (DUT) 20. The optical test set 12 is comprised of a laser 12a, directional coupler 12b, and a photodiode 12c. The device-under-test 20 is connected to fiber #3 at the measurement reflection plane. Optical matched loads 22, represented by triangles, are connected to the device-under-test output and fiber #2 of the directional coupler 12b to prevent multiple reflections. The purpose of the present apparatus is to achieve accurate reflection calibration of a network analyzer which is used to measure the reflection behavior of microwave-modulated optical signals in fiber optic devices and networks.

The fiber optic calibration standard apparatus is analogous to electrical reflection calibration standards so that the proven techniques of electrical error correction can be applied to fiber optic network analysis. Since the quantity to be measured is a microwave signal, which resides as double-sideband modulation on the optical carrier signal, the same benefits in accuracy that are achieved for electrical reflection scattering parameter measurements by means of error correction can also be achieved for microwave fiber optic reflection scattering parameter measurements.

The microwave fiber optic calibration standards include a fiber optic short circuit, a fiber optic offset short circuit and a matched termination which are shown in various embodiments in FIGS. 3 through 6. These three components are used in concert to calibrate a vector network analyzer for the measurement of microwave reflection scattering parameters of fiber optic devices. The calibration standards are used in conjunction with an optical test set 12, which is shown in FIG. 2. The cleaved endface of fiber #3 that leads from the fiber optic directional coupler 12b is designated as the reflection measurement reference plane. The reflection calibration standards are connected and measured, in turn, to fiber #3, and the calibration data is obtained for later use during error correction. A device-under-test 20 also can then be connected to fiber #3 and measured at the reference plane. The actual reflection behavior of the device-under-test 20 is determined by using the previously measured reflection behavior of the three calibration standards to calculate error correction terms which remove the effect of test set imperfections by means of a mathematical process called de-embedding.

Figure 3A:
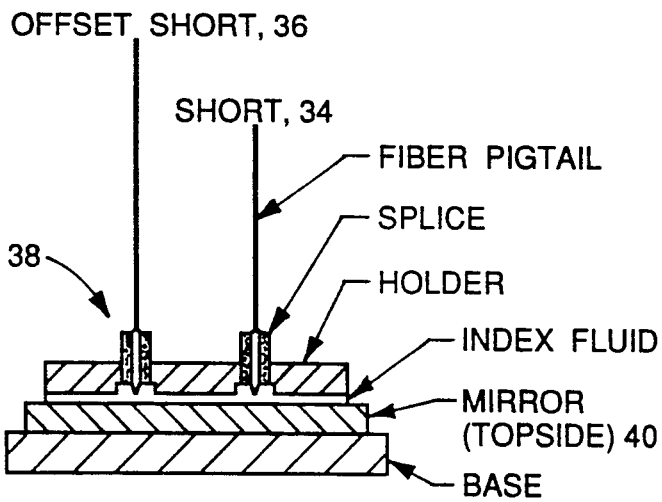
FIGS. 3a and 3b are cross-sectional views, respectively of the fiber optic short circuit and offset short circuit, and the matched termination, all of which comprise the fiber optic calibration standards.
Figure 3B:
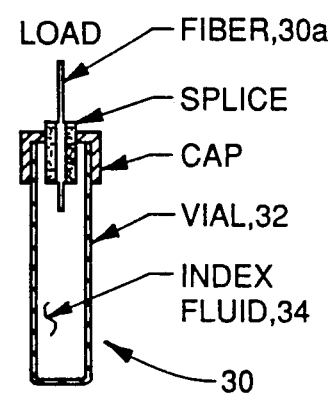

The fiber optic short circuit, offset short circuit and matched termination are illustrated in the cross-sectional assembly drawing shown in FIGS. 3a and 3b. The matched termination 30 is a segment of step-index single mode optical fiber 30a cleaved at both ends. One end is connected to the reflection measurement reference plane (fiber #3 in FIG. 2), and the other end is inserted into a vial 32 of refractive index matching gel 34, which is a viscous fluid exhibiting the same optical density as the fiber. Light that is directed into the matched termination is guided as a single electromagnetic transmission mode by the optical fiber. Upon reaching the fiber/gel interface, the light becomes multi-moded resulting from the ratio of the vial diameter to the optical wavelength. Due to the multi-mode behavior of the light, scattering and dispersion occur within the vial which results in only a small percentage of optical power to re-enter the fiber. Several matched terminations were fabricated and tested. The average measured optical return loss, the ratio of the emergent optical power to the incident optical power, was $-50$ dB.

Figure 4:
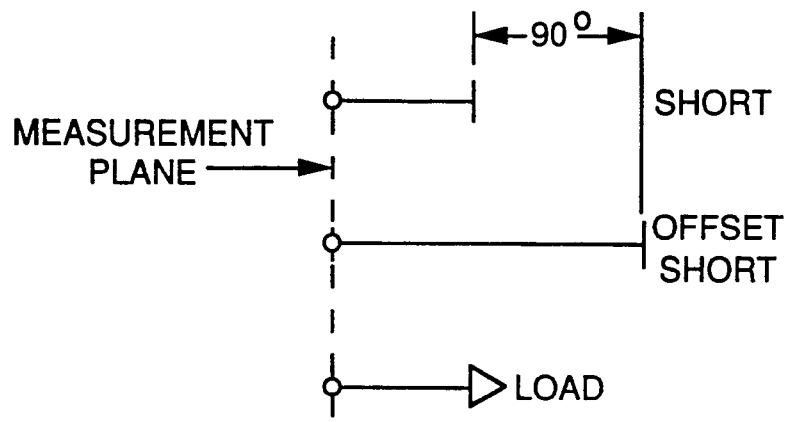
FIG. 4 is a schematic diagram of the microwave fiber optic reflection calibration standards.
Figure 5:
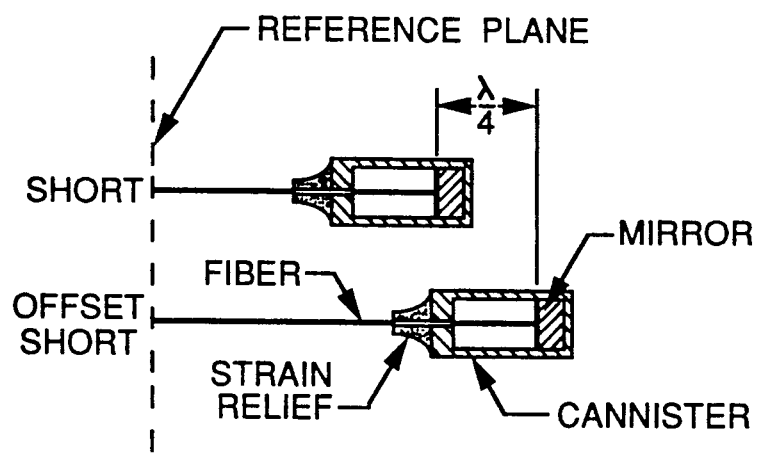
FIG. 5 is a cross-sectional view of canister-type short and offset short calibration standards.

The short circuit 34 and offset short circuit 36 are shown in FIG. 3a. These short circuit elements are used together as a pair and can be referred to simply as offset shorts 38. These calibration elements are identical except that the fiber on the offset short circuit 36 is longer than that on the short circuit 34 by a distance corresponding to one quarter-wavelength of the microwave modulating signal. This distance is determined by dividing the free space wavelength of the microwave signal by the effective refractive index of the optical fiber. The fibers used with these calibration elements are also cleaved at both ends; one end is for connection to the reflection measurement reference plane, and the other end is in contact with the reflective surface of a mirror 40, such that the longitudinal axis of the fiber is perpendicular to the plane of the mirror. The reflective surface of the mirror 40 is spectrally matched to the optical wavelength of the light in the fiber so that a maximum reflectivity occurs at the fiber's characteristic wavelength. The offset shorts 38 produce high reflections, with the reflected microwave modulations differing in phase by 180 degrees. Due to this phase difference, the offset shorts 38 exhibit microwave behavior in close agreement with the theoretical microwave short circuit and open circuit. The reflectivity of several offset shorts which were fabricated and tested, ranged from 85 percent to 95 percent, and the accuracy of the reflection phases were within $\pm 2$ degrees, at the modulation frequency of 2.0 GHz. The use of the present calibration standard apparatus gives a reflection magnitude measurement uncertainty of $\pm 0.15$ dB. The accuracy data for the reflection calibration standards has been verified through experimentation. The schematic representation of the calibration standard apparatus is shown in FIG. 4.

The offset shorts calibration standards may be fabricated in one of two alternate fashions which are described as follows. In FIG. 4 there is shown a cross-sectional view of the canister type offset shorts. The offset shorts comprise optical fibers which are terminated perpendicular to a top-side mirror disk within a canister. The canister may be filled with air or an index matching fluid. This alternate configuration improves the stability and repeatability of the calibration standards because the fibers can be permanently fixed in position.

Figure 6:
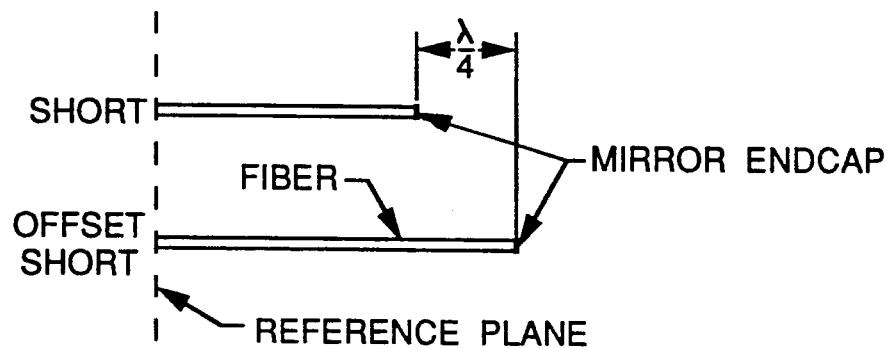
FIG. 6 is a plan view of mirrored fiber endface-type offset shorts.

The offset shorts calibration standard which is shown in FIG. 6 comprises optical fibers with endcap mirrors. The pair of offset shorts may be fabricated by plating, sputtering, evaporating, or otherwise coating the cleaved fiber endfaces with a highly reflective material to form a mirror cap on one end of each fiber. This method results in greater simplicity since mechanical parts are not required, and manufacturing should be less costly, more expedient, and more accurate.

The optical matched termination or matched load may be used in an alternate manner of use to the description previously given. Since the matched termination can sink optical signals by 50 dB, this device can be used anywhere in a fiber optic network where a cleaved fiber exists, to prevent unwanted reflections. One particular example of this application is shown in FIG. 2. The optical matched termination is placed at the output of the device-under-test to prevent double reflections during reflection measurements. A second matched termination is also placed at fiber #2 of the fiber optic directional coupler in the optical test set for the same purpose.

Although the invention has been described with reference to a particular embodiment, it will be understood to those skilled in the art that the invention is capable of a variety of alternative embodiments within the spirit and scope of the appended claims.

What is claimed is:

1. A fiber optic calibration standard apparatus comprising:
    means for reflecting a signal, said signal reflecting means having a first end and a second end, said first end receiving an input signal, said second end is in contact with the reflective surface of a mirror, said second end and said reflective surface are immersed in an index fluid,
    means for reflecting an offset signal, said offset signal reflecting means having a first end and a second end, said first end receiving an input signal, said second end is in contact with the reflective surface of a mirror, said second end and said reflective surface are immersed in an index fluid, said offset signal reflecting means is longer than said signal reflecting means by a predetermined length, and
    means for terminating, said terminating means having a first end and a second end, said first end receiving a single mode modulated signal, said second end is sealed in a vial containing a fluid.

2. A fiber optic calibration standard apparatus as described in claim 1 wherein said signal reflecting means comprises an optical fiber.

3. A fiber optic calibration standard apparatus as described in claim 1 wherein said offset signal reflecting means comprises an optical fiber.

4. A fiber optic calibration standard apparatus as described in claim 1 wherein said reflective surface of said mirror is spectrally matched to the optical wavelength of the signal in the said signal reflecting means so that a maximum reflectivity occurs at the characteristic wavelength.

5. A fiber optic calibration standard apparatus as described in claim 1 wherein said offset signal reflective surface of said mirror is spectrally matched to the optical wavelength of the signal in the said offset means so that a maximum reflectivity occurs at the characteristic wavelength.

6. A fiber optic calibration standard apparatus as described in claim 1 wherein said index fluid matches the refractive index of said signal reflecting means.

7. A fiber optic calibration standard apparatus as described in claim 1 wherein said fluid comprises a refractive index matching gel.

8. A fiber optic calibration standard apparatus as described in claim 1 wherein said predetermined length equals one quarter wavelength of the said modulated signal.

9. A fiber optic calibration standard apparatus as described in claim 1 wherein said terminating means comprises an optical fiber which is cleaved at both ends.

10. A fiber optic calibration standard apparatus as described in claim 1 wherein said signal reflecting means comprises an optical fiber which is cleaved at both ends, one end is for connection to the reflection measurement reference plane, the other end is in contact with said reflective surface of a mirror, such that the longitudinal axis of said fiber is perpendicular to the plane of said mirror.

11. A fiber optic calibration standard apparatus as described in claim 1 wherein said offset signal reflecting means comprises an optical fiber which is cleaved at both end, one end is for connection to the reflection measurement reference plane, the other end is in contact with said reflective surface of a mirror, such that the longitudinal axis of said fiber is perpendicular to the plane of said mirror.

12. A fiber optic calibration standard apparatus as described in 1 wherein said reflecting means comprises an optical fiber which has an end cap mirror on one end.

13. A fiber optic calibration standard apparatus as described in 1 wherein said offset signal reflecting means comprises an optical fiber which has an end cap mirror on one end.

14. A fiber optic calibration standard apparatus as described in claim 9 wherein said optical fiber is a step-index single mode fiber.

15. A fiber optic calibration standard apparatus as described in claim 10 wherein said optical fiber and said mirror are contained within a canister filled with a fluid.

16. A fiber optic calibration standard apparatus as described in claim 11 wherein said optical fiber and said mirror are contained within a canister filled with a fluid.

17. A fiber optic calibration standard apparatus as described in claim 15 wherein said fluid comprises air.

18. A fiber optic calibration standard apparatus as described in claim 15 wherein said fluid comprises an index matching fluid.

19. A fiber optic calibration standard apparatus as described in claim 16 wherein said fluid comprises air.

20. A fiber optic calibration standard apparatus as described in claim 16 wherein said fluid comprises an index matching fluid.

* * * * *